US012710276B2

(12) United States Patent
Adeyemi Fowe et al.

(10) Patent No.: US 12,710,276 B2
(45) Date of Patent: Aug. 18, 2026

(54) METHOD AND ALGORITHM FOR MAP-MATCHING TRIPS TO POIs

(71) Applicant: HERE GLOBAL B.V., Eindhoven (NL)

(72) Inventors: James Adeyemi Fowe, Evanston, IL (US); Amarnath Nayak, Mumbai (IN); Bruce Bernhardt, Wauconda, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 19/002,728

(22) Filed: Dec. 27, 2024

(65) Prior Publication Data

US 2026/0185835 A1 Jul. 2, 2026

(51) Int. Cl.

*G01C 21/32* (2006.01)
*G01C 21/00* (2006.01)
*G06N 7/01* (2023.01)

(52) U.S. Cl.

CPC .......... *G01C 21/32* (2013.01); *G01C 21/3811* (2020.08); *G01C 21/3841* (2020.08); *G06N 7/01* (2023.01)

(58) Field of Classification Search

CPC .......................... G01C 21/32; G01C 21/3841; G01C 21/3811; G06N 7/01

See application file for complete search history.

(56) References Cited

U.S. PATENT DOCUMENTS 9,514,651 B2 12/2016 Linder et al.
9,766,625 B2 9/2017 Boroditsky et al.
2011/0313648 A1 12/2011 Newson et al.
2018/0087922 A1* 3/2018 Wu ..................... G09B 29/106
2018/0335307 A1 11/2018 Chen et al.

(Continued)

FOREIGN PATENT DOCUMENTS

CN 111121791 A 5/2020

OTHER PUBLICATIONS

Xiong et al., "Map-Matching Using Hidden Markov Model and Path Choice Preferences under Sparse Trajectory", Sustainability, vol. 13, Nov. 19, 2021, pp. 1-16.

(Continued)

*Primary Examiner* — Jay Khandpur

(74) *Attorney, Agent, or Firm* — Michael Yu; HERE GLOBAL B.V.

(57) ABSTRACT

A method, system and computer program product for map-matching a probe to a point-of-interest (POI) during a trip by a vehicle in a region are disclosed. The method includes identifying POIs in the region; determining, for probes in the region, a latitude location of the probes, a longitude location of the probes and a data collection time stamp for the probes; determining, for each of the probes in the region, a proximity between the probes and the POIs within a predetermined radius of the probes; determining, for each of the POIs, a POI geographic coverage area; calculating an observed POI probability from the proximity and the POI geographic coverage area; and using a Hidden Markov Model to sequentially process the observed POI probability from a predetermined number of probes of the trip and to predict a most likely POI at which the probes are clustered.

20 Claims, 6 Drawing Sheets

(56) References Cited

U.S. PATENT DOCUMENTS

| | | | | |
|---|---|---|---|---|
| 2021/0285777 | A1* | 9/2021 | Ostadzadeh ....... | G01C 21/3617 |
| 2024/0003705 | A1 | 1/2024 | Maischberger et al. | |

OTHER PUBLICATIONS

"IMT-2020" Wikipedia, Retrieved on Dec. 19, 2024, Webpage available at https://en.wikipedia.org/wiki/IMT-2020.
"IEEE 802.11" Wikipedia, Retrieved on Aug. 8, 2024, Webpage available at https://en.wikipedia.org/wiki/IEEE_802.11.
"IEEE 802.16" Wikipedia, Retrieved on Dec. 19, 2024, Webpage available at https://en.wikipedia.org/wiki/IEEE_802.16.

* cited by examiner

Probe
Proximity-distance
Radius
109
110
111
113
112

POI-1
POI-2
POI-3
POI-4
Origin
Trip1
Trip2
Trip3
102
103
104
105
106
107
108
100

METHOD AND ALGORITHM FOR MAP-MATCHING TRIPS TO POIs

TECHNOLOGICAL FIELD

An example aspect of the present disclosure generally relates to matching points-of-interest in a region to trips made in the region, and more particularly, but without limitation, relates to a system, a method, and a computer program product map-matching a probe to a point-of-interest during a trip by a vehicle in a region using machine learning models.

BACKGROUND

In the field of ITS, probe data is used to obtain insight about Trips Origin-Destination (OD) in that one does not only look at the routing paths of Trips, but also to understand at the Origin and the Destination POIs of Trips. Given the noisy nature of probe data, determining the actual POI that Trips that departs or arrived at is a non-trivial problem. What is needed is a map-matcher application that uses the sequence of a few probe trajectories at the start or end of a trip to determine the most likely POI the Trip is associated to using Geometry and Machine Learning algorithms, for example. Such a system opens up many possibilities and opportunities to bring dynamic content data into POIs and be able to derive spatiotemporal insight of Trips at POIs or ODs.

BRIEF SUMMARY

The present disclosure provides a system, a method and a computer program product for map-matching a probe to a point-of-interest during a trip by a vehicle in a region, in accordance with various aspects.

Aspects of the disclosure provide a computer implemented method for map-matching a probe to a point-of-interest during a trip by a vehicle in a region. The method includes identifying one or more POIs in the region; determining, for one or more probes in the region, a latitude location of the one or more probes, a longitude location of the one or more probes and a data collection time stamp for the one or more probes; determining, for each of the one or more probes in the region, a proximity between the one or more probes and the one or more POIs within a predetermined radius of the one or more probes; determining, for each of the one or more POIs, a POI geographic coverage area; calculating an observed POI probability from the proximity and the POI geographic coverage area; and using a machine learning model to sequentially process the observed POI probability from a predetermined number of probes of the trip and to predict a most likely POI at which the one or more probes is clustered.

Aspects of the disclosure may provide a system for map-matching a probe to a point-of-interest during a trip by a vehicle in a region. The system includes at least one memory configured to store computer executable instructions; and at least one processor configured to execute the computer executable instructions to: identify one or more POIs in the region; determine, for one or more probes in the region, a latitude location of the one or more probes, a longitude location of the one or more probes and a data collection time stamp for the one or more probes; determine, for each of the one or more probes in the region, a proximity between the one or more probes and the one or more POIs within a predetermined radius of the one or more probes; determine, for each of the one or more POIs, a POI geographic coverage area; calculate an observed POI probability from the proximity and the POI geographic coverage area; and use a machine learning model to sequentially process the observed POI probability from a predetermined number of probes of the trip and to predict a most likely POI at which the one or more probes is clustered.

Aspects of the disclosure may provide a computer program product comprising a non-transitory computer readable medium having stored thereon computer executable instructions, which when executed by one or more processors, cause the one or more processors to carry out operations for map-matching a probe to a point-of-interest during a trip by a vehicle in a region. The operations include identifying one or more POIs in the region; determining, for one or more probes in the region, a latitude location of the one or more probes, a longitude location of the one or more probes and a data collection time stamp for the one or more probes; determining, for each of the one or more probes in the region, a proximity between the one or more probes and the one or more POIs within a predetermined radius of the one or more probes; determining, for each of the one or more POIs, a POI geographic coverage area; calculating an observed POI probability from the proximity and the POI geographic coverage area; and using a machine learning model to sequentially process the observed POI probability from a predetermined number of probes of the trip and to predict a most likely POI at which the one or more probes is clustered.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figures 1A, 1B, 1C:
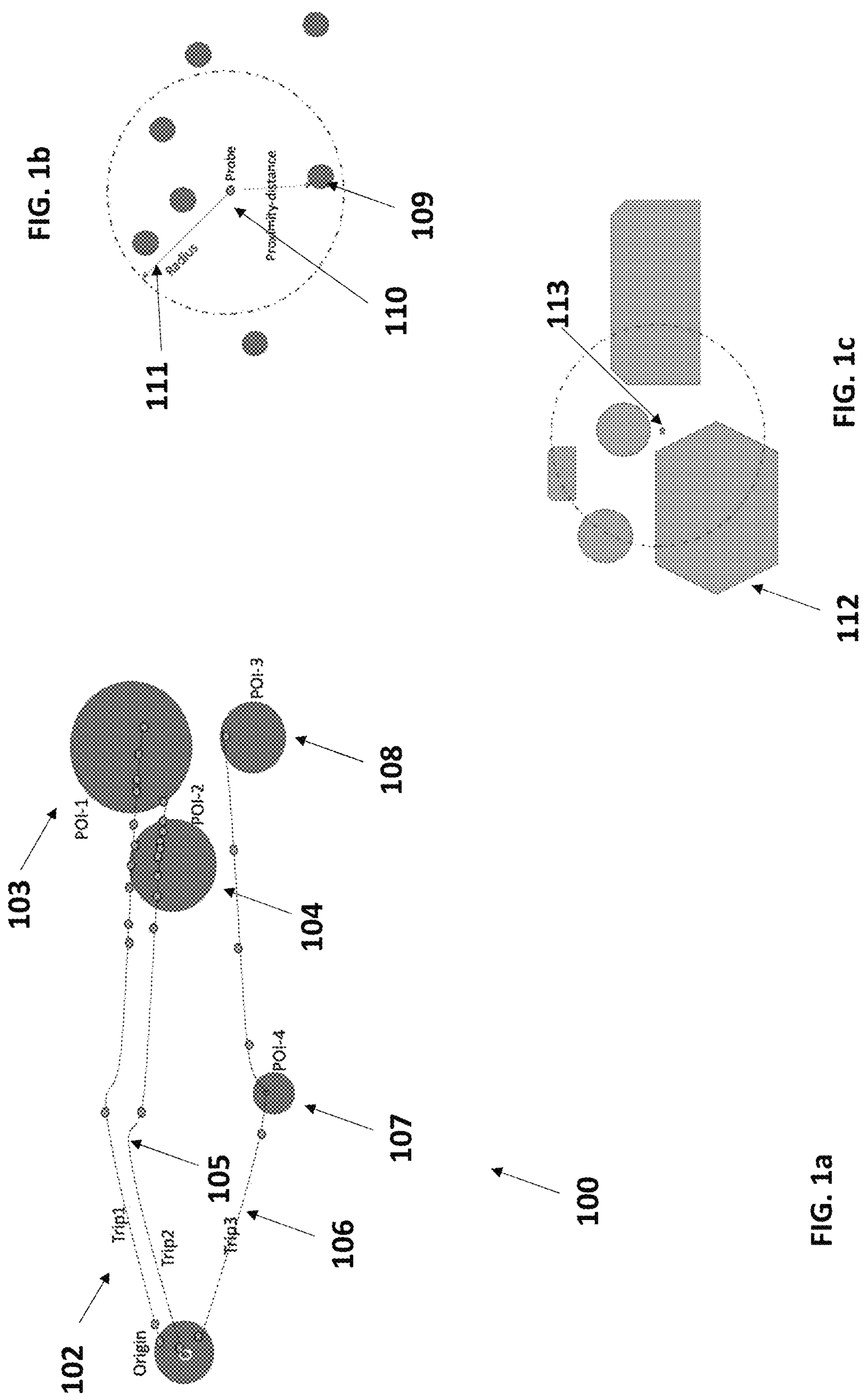

Having thus described certain aspects of the disclosure in general terms, reference will now be made to the accompanying drawings, which are not necessarily drawn to scale, and wherein:

FIG. 1*a* a schematic view of example trips made by a vehicle in a certain region.

FIG. 1*b* illustrates a schematic view of using a proximity of a POI to a vehicle probe within a predetermined radius of scanning.

FIG. 1*c* illustrates a schematic view of POI polygon geometry as used in relation to a vehicle probe location.

Figure 2:
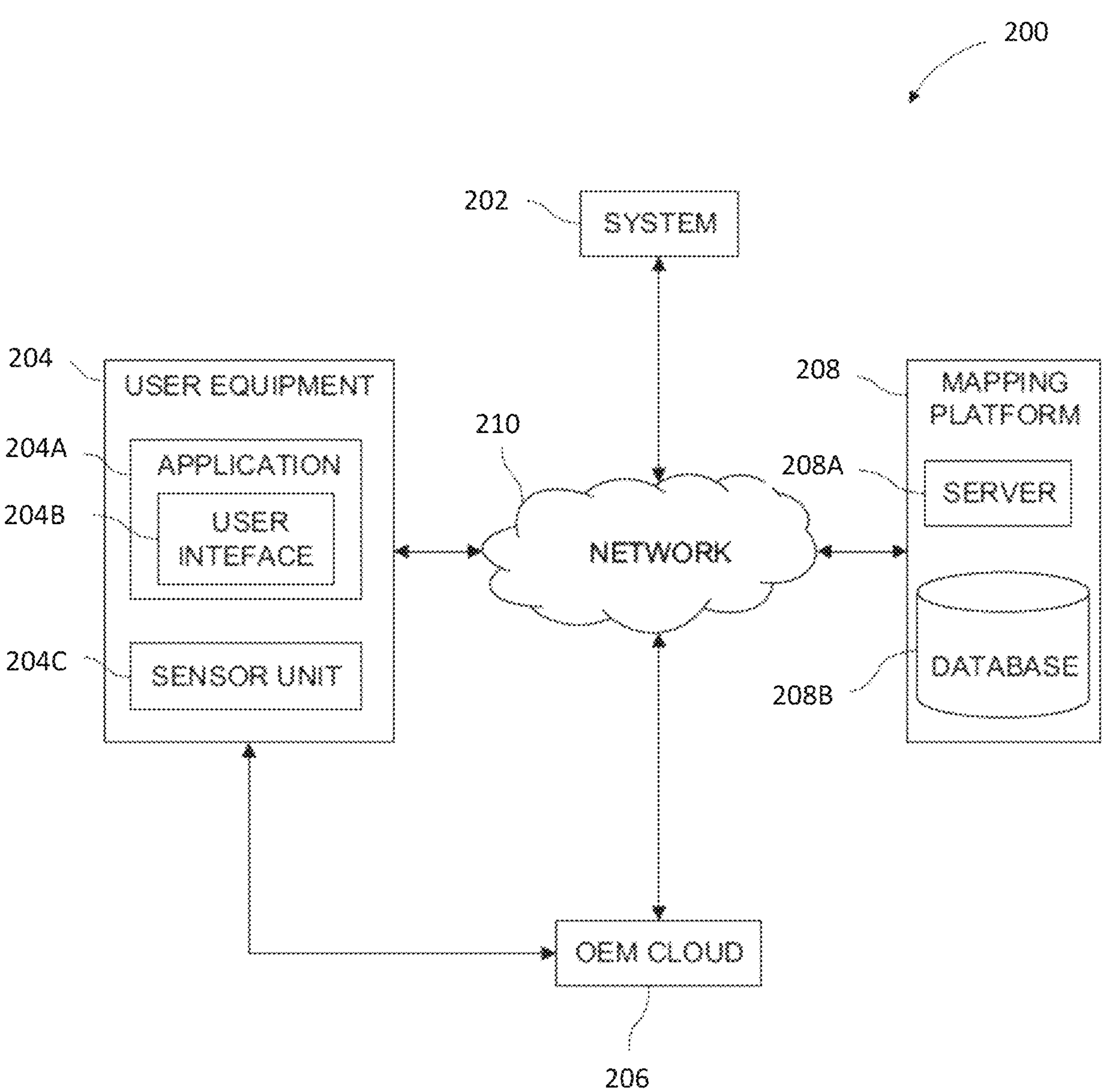
Figure 3:
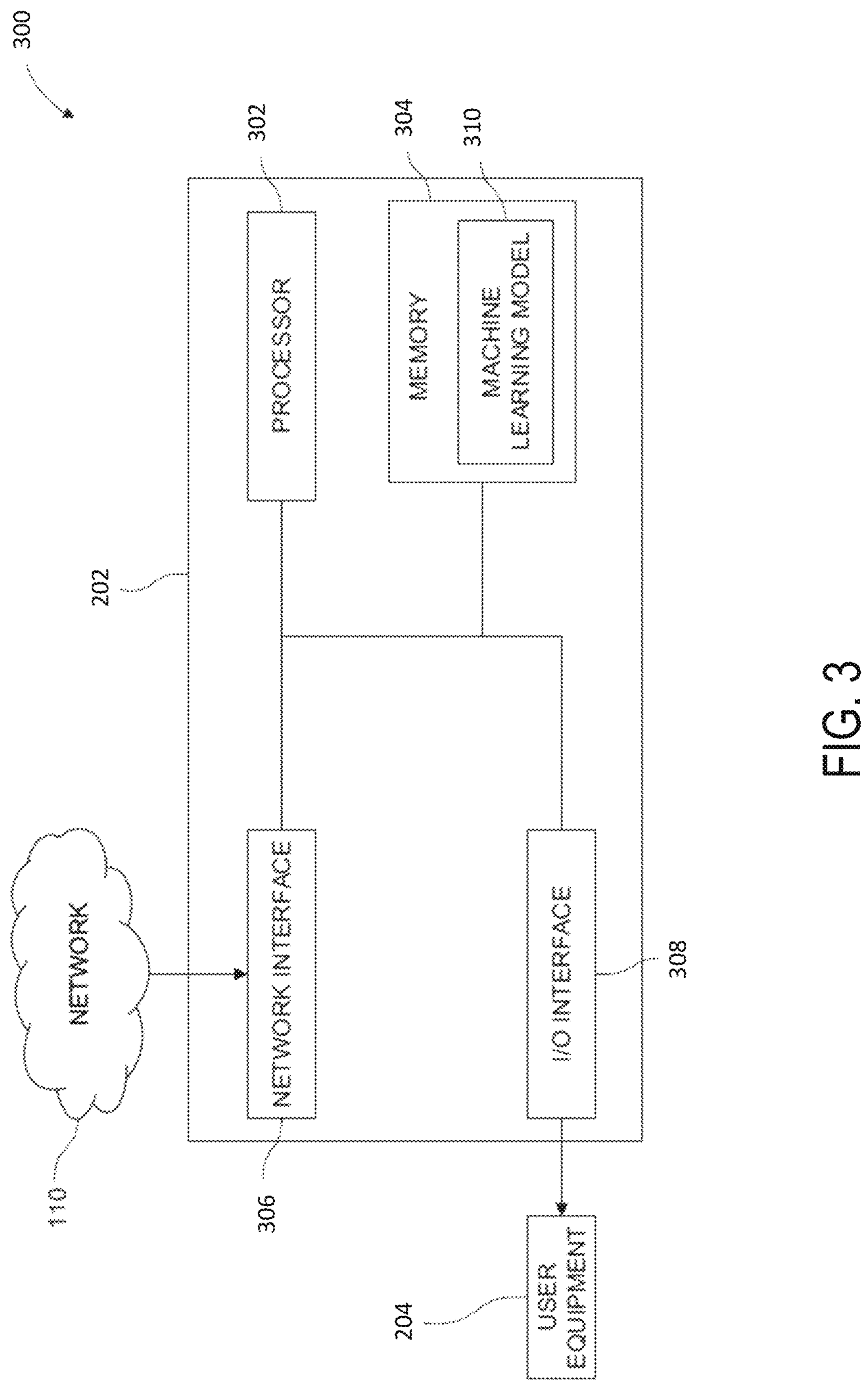
Figure 4:
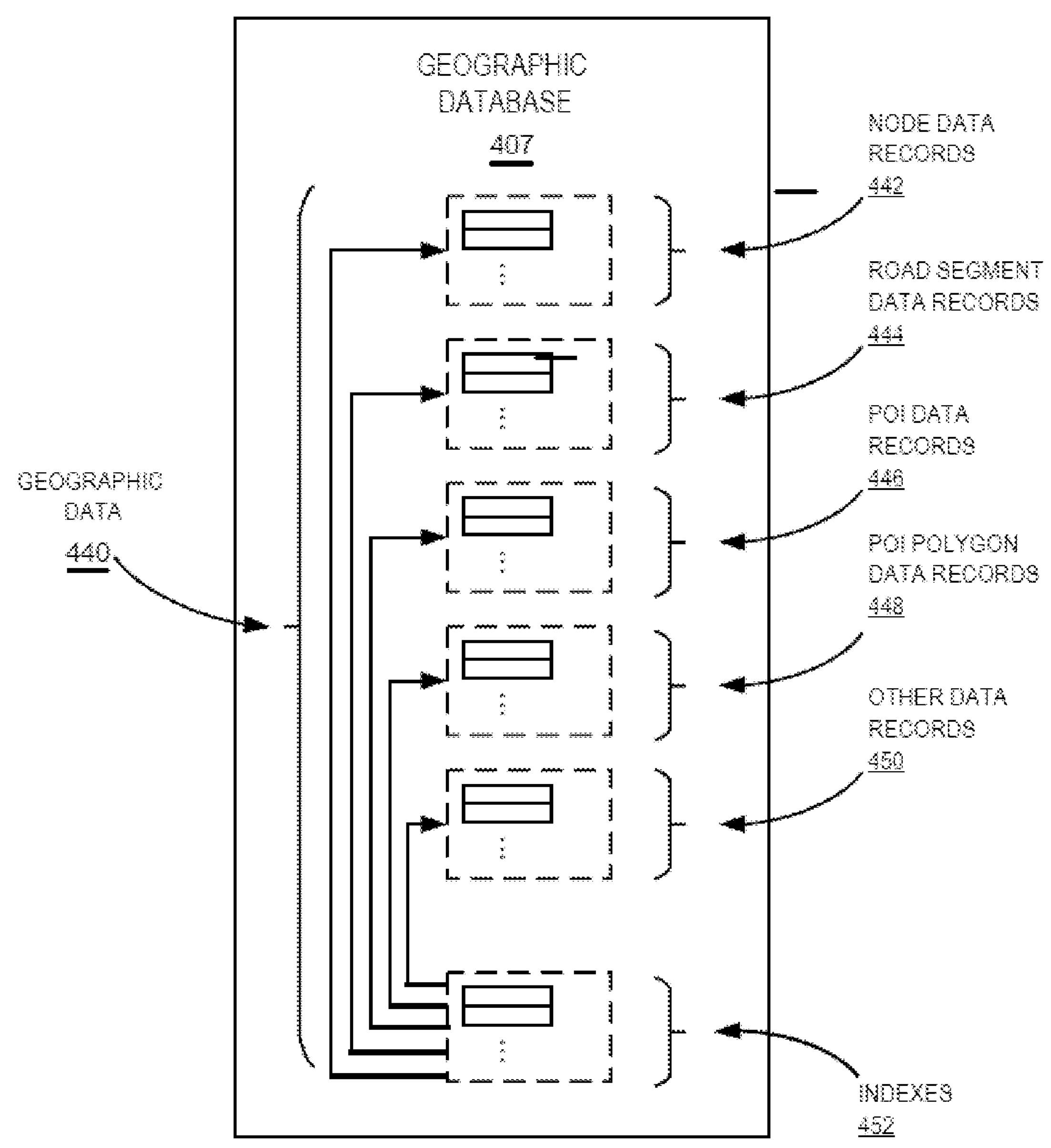
Figure 5:
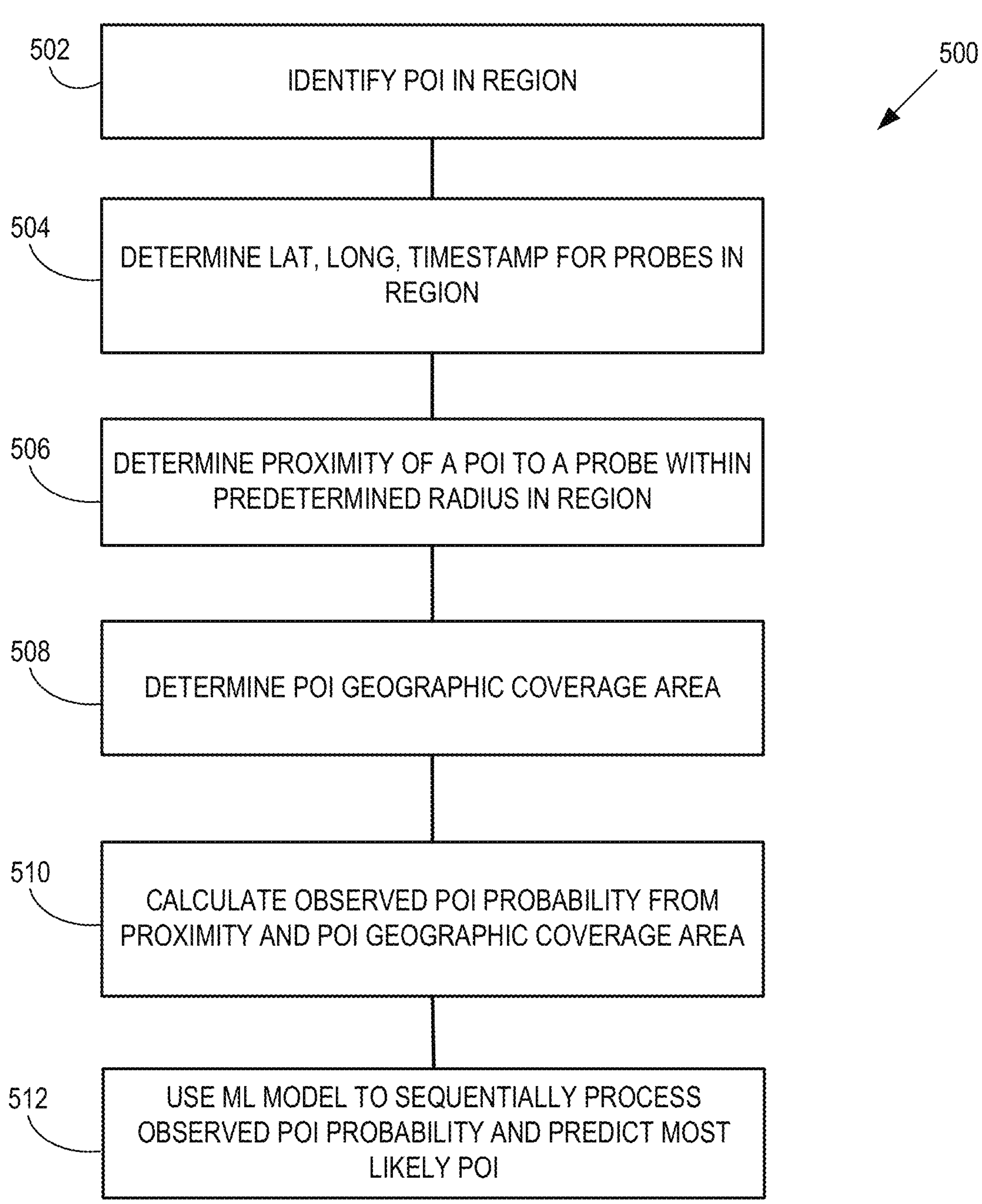

FIG. 2 illustrates a schematic diagram of a network environment 200 of a system 202 for map-matching a probe to a point-of-interest during a trip by a vehicle in a region, in accordance with an example aspect;

FIG. 3 illustrates a block diagram of the system for map-matching a probe to a point-of-interest during a trip by a vehicle in a region, in accordance with an example aspect;

FIG. 4 illustrates an example map or geographic database for use by the system for map-matching a probe to a point-of-interest during a trip by a vehicle in a region, in accordance with an example aspect; and FIG. 5 illustrates a flowchart 400 for acts taken in an exemplary method for map-matching a probe to a point-of-interest during a trip by a vehicle in a region, in accordance with an aspect.

Figure 6:
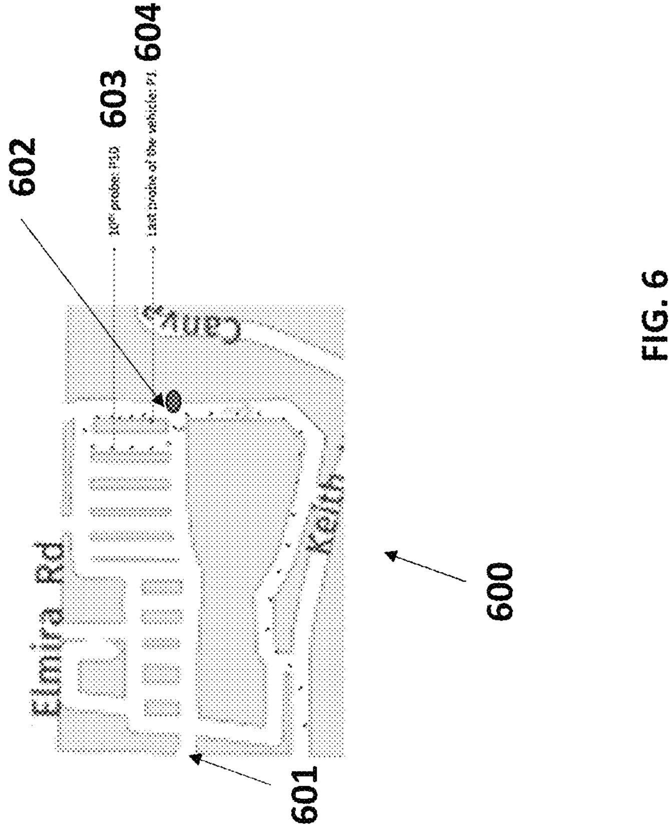

FIG. 6 illustrates an example application of the disclosed map-matching system.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

Given the noisy nature of probe data, determining an actual POI that Trips that departs or arrived at is a non-trivial problem. The disclosure provides a map-matcher that uses the sequence of a few vehicle probe trajectories at the start or end of a trip to determine the most likely POI the Trip is associated to using geometry considerations and machine learning models in combination to determine probabilities based on these two aspects. The disclosed system and method opens up many possibilities and opportunities to bring dynamic content data into POIs and be able to derive spatiotemporal insight of Trips at POIs or ODs.

The current issue in map-matching is that one need to shave a way to figure out the exact parking location of vehicles and, given the noisy nature of probe data and the high proximity of some POIs, one needs a robust map-matching algorithm to solve this problem.

We present the POI Trip map-matcher (POI-TMM) a method and algorithm that uses the POI location and its boundary polygon from the places footprint data artifact in combination with the first or last 10 GPS probes of a Trips probe trajectory to compute map-matching.

The disclosed system and method map-match probes to neighboring POI using a probabilistic system that exploits the proximity of POI and their corresponding polygon coverage area to elicit the most likely POI that the vehicle or Trip arrived at or departed from.

The disclosed system and method uses a Hidden Markov Model (HMM) Machine Learning Model to sequentially process observed POI probabilities from a predetermined number of probes of the Trip and use them to predict the most likely POI the vehicle probes is clustered at. In some aspects, a predetermined number of 10 probes may be advantageous.

For example, in an aspect, the first or the last 10 probes of the Trip is used to generate probabilities and are sent into an HMM to make inference on the most likely POI where the vehicle is located. In an aspect, the last 10 probes of the Trip's probe trajectory within maximum of a predetermined distance, such as 100 m distance from the last probe, are selected and used for the algorithm computation.

For the purposes of this disclosure for illustrative purposes and without limitation a hidden Markov model (HMM) is a Markov model in which the observations are dependent on a latent (or hidden) Markov process (referred to as X). An HMM requires that there be an observable process Y whose outcomes depend on the outcomes of X in a known way.

Because X cannot be observed directly, the goal is to learn about state of X by observing Y. By definition of being a Markov model, an HMM has an additional requirement that the outcome of Y at time t=t 0 must be "influenced" exclusively by the outcome of X at t=t 0 and that the outcomes of X and Y at t<t 0 must be conditionally independent of Y at t=t 0 given X at time t=t 0. Estimation of the parameters in an HMM can be performed using maximum likelihood estimation. For linear chain HMMs, the Baum-Welch algorithm can be used to estimate parameters.

FIG. 1*a* illustrates a schematic view of example trips 100 made by a vehicle in a certain region. As shown, Trip1 102 traversed around POI-2 104 before getting to POI-1 103. The goal is for the disclosed map-matcher to accurately detect that POI-1 103 has the destination rather than get confused about the close proximity of POI-2 104.

For Trip2 105, the last probe seems to have parked in POI-1 103. However, this is due to probe noise, and the goal is to have a robust map-matcher that sees that the majority of the last 10 probes of the trip clustered more at POI-2 104 and then map-matches Trip2 105 to POI-2 104.

For Trip3 106, the vehicle has a very sparse probe readout in which only the last 2 probes made it into an example 100m proximity radius limit. This may help to avoid map-matching to farther away POIs like POI-4 107. Using this to compute the proximity of the last probe to POI-3 108 will match Trip3 to POI-3 108.

FIG. 1*b* illustrates a schematic view of using a proximity of a POI 109 to a vehicle probe 110 within a predetermined radius 111 of scanning. To obtain the observation probability for each probe, we use both proximity and coverage area.

From each probe point 110, we scan a 30 m radius, for example, for nearby POIs 109 that could be the potential match for the probe 110 or Trip.

FIG. 1*c* illustrates a schematic view of POI polygon geometry 112 as used in relation to a vehicle probe 113 location. The disclosed system and method uses the POI's polygon geometry 112 to infer how much area or coverage and size each POI is such that the vehicle probe 113 maybe found in this POI. In an aspect, the probability of the vehicle probe 113 probe being at this POI is a combination of the proximity and the area coverage in the example 30m radius around the vehicle probe 113.

FIG. 2 illustrates a schematic diagram of a network environment 200 of a system 202 for map-matching a probe to a point-of-interest during a trip by a vehicle in a region, in accordance with an example aspect. The system 202 may be communicatively coupled with, a user equipment (UE) 204, an OEM cloud 206, a mapping platform 208, via a network 210. The UE 204 may be a vehicle electronics system, onboard automotive electronics/computers, a mobile device such as a smartphone, tablet, smart watch, smart glasses, laptop, wearable device or other UE platforms known to one of skill in the art. The mapping platform 208 may further include a server 208A and a database 208B. The user equipment includes an application 204A, a user interface 204B, and a sensor unit 204C. Further, the server 208A and the database 208B may be communicatively coupled to each other.

The system 202 may comprise suitable logic, circuitry, interfaces and code that may be configured to process the sensor data obtained from the UE 204 for speed, traffic, road and weather conditions in a region, that may be used to assist a user or driver for map-matching a probe to a point-of-interest during a trip by a vehicle in a region. Such features can also include historical and real-time vehicle probe data, weather reports, congestion reports, traffic and construction reports, or a combination thereof.

The system 202 may be communicatively coupled to the UE 204, the OEM cloud 206, and the mapping platform 208 directly via the network 210. Additionally, or alternately, in some example aspects, the system 202 may be communicatively coupled to the UE 204 via the OEM cloud 206 which in turn may be accessible to the system 202 via the network 210.

All the components in the network environment 100 may be coupled directly or indirectly to the network 210. The components described in the network environment 100 may be further broken down into more than one component and/or combined together in any suitable arrangement. Further, one or more components may be rearranged, changed, added, and/or removed. Furthermore, fewer or additional components may be in communication with the system 202, within the scope of this disclosure.

The system 202 may be embodied in one or more of several ways as per the required implementation. For example, the system 202 may be embodied as a cloud-based service or a cloud-based platform. As such, the system 202 may be configured to operate outside the UE 204. However, in some example aspects, the system 202 may be embodied within the UE 204. In each of such aspects, the system 202 may be communicatively coupled to the components shown in FIG. 2 to carry out the desired operations and wherever required modifications may be possible within the scope of the present disclosure.

The UE 204 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 204 may comprise a processor, a memory and a network interface. The processor, the memory and the network interface may be communicatively coupled to each other. In some example aspects, the UE 204 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 204 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 204. Additional, different, or fewer components may be provided. For example, the UE 204 may be configured to execute and run mobile applications such as a messaging application, a browser application, a navigation application, and the like. In accordance with an aspect, the UE 204 may be directly coupled to the system 202 via the network 210. For example, the UE 204 may be a dedicated vehicle (or a part thereof) for gathering data for development of the map data in the database 208B. In some example aspects, the UE 204 may be coupled to the system 202 via the OEM cloud 206 and the network 210. For example, the UE 204 may be a consumer mobile phone (or a part thereof) and may be a beneficiary of the services provided by the system 202. In some example aspects, the UE 204 may serve the dual purpose of a data gatherer and a beneficiary device. The UE 204 may be configured to provide sensor data to the system 202. In accordance with an aspect, the UE 204 may process the sensor data for information that may be used for map-matching a probe to a point-of-interest during a trip by a vehicle in a region, such as weather, traffic conditions, construction, vehicle probe data, etc. Further, in accordance with an aspect, the UE 204 may be configured to perform processing related to map-matching a probe to a point-of-interest during a trip by a vehicle in a region.

The UE 204 may include the application 204A with the user interface 204B to access one or more applications. The application 204B may correspond to, but not limited to, map related service application, navigation related service application and location-based service application. In other words, the UE 204 may include the application 204A with the user interface 204B. The user interface 204B may be a dedicated user interface configured to traffic and road conditions to the user. The user interface 204B may be in the form of a map depicting regions with favorable or unfavorable traffic and routing options, according to aspects of the disclosure.

The sensor unit 204C may be embodied within the UE 204. The sensor unit 204C comprising one or more sensors may capture sensor data, in a certain geographic location. In accordance with an aspect, the sensor unit 204C may be built-in, or embedded into, or within interior of the UE 204. The one or more sensors (or sensors) of the sensor unit 204C may be configured to provide the sensor data comprising location data associated with a location of a user. In accordance with an aspect, the sensor unit 204C may be configured to transmit the sensor data to an Original Equipment Manufacturer (OEM) cloud. Examples of the sensors in the sensor unit 204C may include, but not limited to, a microphone, a camera, an acceleration sensor, a gyroscopic sensor, a LIDAR sensor, a proximity sensor, and a motion sensor.

The sensor data may refer to sensor data collected from a sensor unit 204C in the UE 204. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 202, to accurately receive the sensor data at the system 202. Additionally, or alternately, the sensor data of a UE 204 may correspond to movement data associated with a user of the user equipment. Without limitations, this may include motion data, position data, orientation data with respect to a reference and the like.

The mapping platform 208 may comprise suitable logic, circuitry, interfaces and code that may be configured to store map data associated with a geographic area in the region of interest related to geographic or other physical features that may assist in navigation and route selection for the user. The map data may include traffic features and include historical (or static) traffic features such as road layouts, pre-existing road networks, business, educational and recreational locations, POI locations, historical and real-time weather conditions in the region or a combination thereof. The server 208A of the mapping platform 208 may comprise processing means and communication means. For example, the processing means may comprise one or more processors configured to process requests received from the system 202 and/or the UE 204. The processing means may fetch map data from the database 208B and transmit the same to the system 202 and/or the UE 204 in a suitable format. In one or more example aspects, the mapping platform 208 may periodically communicate with the UE 204 via the processing means to update a local cache of the map data stored on the UE 204. Accordingly, in some example aspects, map data may also be stored on the UE 204 and may be updated based on periodic communication with the mapping platform 208.

In an aspect, the map data may include, and the database 208B of the mapping platform 208 may store real-time, dynamic data about features for map-matching a probe to a point-of-interest during a trip by a vehicle in a region. For example, real-time data may be collected for vehicle probe data, weather reports, congestion reports, traffic and construction reports or a combination thereof. Other data records may include computer code instructions and/or algorithms for executing a trained machine learning model that is capable of map-matching a probe to a point-of-interest during a trip by a vehicle in a region.

The database 208B of the mapping platform 208 may store map data of one or more geographic regions that may correspond to a city, a province, a country or of the entire world. The database 208B may store point cloud data collected from the UE 204. The database 208B may store data such as, but not limited to, node data, road segment data, link data, point of interest (POI) data, link identification information, and heading value records. The database 208B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 208B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 208B may also store data about the POIs and their respective locations in the POI records. The database 208B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 208B may include event data (e.g., traffic incidents, construction activities, scheduled events, unscheduled events, accidents, diversions etc.) associated with the POI data records or other records of the database 208B. Optionally or additionally, the database 208B may store 3D building maps data (3D map model of objects) of structures, topography and other visible features surrounding roads and streets, including raised features on the roads.

The database 208B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 204. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 208B may be a master geographic database, but in alternate aspects, the database 208B may be embodied as a client-side map database and may represent a compiled navigation database that may be used in or with end user devices (such as the UE 204) to provide navigation and/or map-related functions. In such a case, the database 208B may be downloaded or stored on the end user devices (such as the UE 204).

The network 210 may comprise suitable logic, circuitry, and interfaces that may be configured to provide a plurality of network ports and a plurality of communication channels for transmission and reception of data, such as the sensor data, map data from the database 208B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 210 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 210 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product configured to map-match a probe to a point-of-interest during a trip by a vehicle in a region may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 3 illustrates a block diagram 300 of the system 302, exemplarily illustrated in FIG. 3, for map-matching a probe to a point-of-interest during a trip by a vehicle in a region, in accordance with an example aspect. FIG. 3 is described in conjunction with elements from FIG. 2.

As shown in FIG. 3, the system 302 may comprise a processing means such as a processor 302, storage means such as a memory 304, a communication means, such as a network interface 306, an input/output (I/O) interface 308, and a machine learning model 310. The processor 302 may retrieve computer executable instructions that may be stored in the memory 304 for execution of the computer executable instructions. The system 302 may connect to the UE 204 via the I/O interface 308. The processor 302 may be communicatively coupled to the memory 304, the network interface 306, the I/O interface 308, and the machine learning model 310.

The processor 302 may comprise suitable logic, circuitry, and interfaces that may be configured to execute instructions stored in the memory 304. The processor 302 may obtain sensor data associated with map-matching a probe to a point-of-interest during a trip by a vehicle in a region. The sensor data may be captured by one or more UE, such as the UE 204. The processor 302 may be configured for map-matching a probe to a point-of-interest during a trip by a vehicle in a region. The processor 302 may be further configured to determine, using a trained machine learning model in conjunction with ground truth of the region, map-matching a probe to a point-of-interest during a trip by a vehicle in a region, where the ground truth of a region comprises current features and POI geometries and areas, for example.

Examples of the processor 302 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 302 may implement a number of processor technologies known in the art such as a machine learning model, a deep learning model, such as a recurrent neural network (RNN), a convolutional neural network (CNN), and a feed-forward neural network, a Hidden Markov Model (HMM) or a Bayesian model. As such, in some aspects, the processor 302 may include one or more processing cores configured to perform independently. A multi-core processor may enable multiprocessing within a single physical package.

Additionally, or alternatively, the processor 302 may include one or more processors configured in tandem via the bus to enable independent execution of instructions, pipelining and/or multithreading. Additionally, or alternatively, the processor 302 may include one or processors capable of processing large volumes of workloads and operations to provide support for big data analysis. However, in some cases, the processor 302 may be a processor specific device (for example, a mobile terminal or a fixed computing device) configured to employ an aspect of the disclosure by further configuration of the processor 302 by instructions for performing the algorithms and/or operations described herein.

In some aspects, the processor 302 may be configured to provide Internet-of-Things (IoT) related capabilities to users of the UE 204 disclosed herein. The IoT related capabilities may in turn be used to provide smart city solutions by providing real time weather and road updates, big data analysis, and sensor-based data collection for providing navigation and charging locations near critical areas. The environment may be accessed using the I/O interface 308 of the system 202 disclosed herein.

The memory 304 may comprise suitable logic, circuitry, and interfaces that may be configured to store a machine code and/or instructions executable by the processor 302. The memory 304 may be configured to store information including processor instructions for training the machine learning model. The memory 304 may be used by the processor 302 to store temporary values during execution of processor instructions. The memory 304 may be configured to store different types of data, such as, but not limited to, sensor data from the UE 204. Examples of implementation of the memory 304 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 306 may comprise suitable logic, circuitry, and interfaces that may be configured to communicate with the components of the system 102 and other systems and devices in the network environment 200, via the network 210. The network interface 306 may communicate with the UE 204, via the network 210 under the control of the processor 302. In one aspect, the network interface 306 may be configured to communicate with the sensor unit 204C disclosed in the detailed description of FIG. 2. In an alternative aspect, the network interface 306 may be configured to receive the sensor data from the OEM cloud 206 over the network 210 as described in FIG. 2. In some example aspects, the network interface 306 may be configured to receive location information of a user associated with a UE (such as, the UE 204), via the network 210. In accordance with an aspect, a controller of the UE 204 may receive the sensor data from a positioning system (for example: a GPS based positioning system) of the UE 204. The network interface 306 may be implemented by use of known technologies to support wired or wireless communication of the system 202 with the network 210. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 308 may comprise suitable logic, circuitry, and interfaces that may be configured to operate as an I/O channel/interface between the UE 204 and different operational components of the system 202 or other devices in the network environment 100. The I/O interface 308 may facilitate an I/O device (for example, an I/O console) to receive an input (e.g., sensor data from the UE 204 for a time duration) and present an output to one or more UE (such as, the UE 204) based on the received input. In accordance with an aspect, the I/O interface 308 may obtain the sensor data from the OEM cloud 206 to store in the memory 202. The I/O interface 308 may include various input and output ports to connect various I/O devices that may communicate with different operational components of the system 202. In accordance with an aspect, the I/O interface 308 may be configured to output mitigation and/or confirmation of critical areas to a user device, such as, the UE 204 of FIG. 1.

In example aspects, the I/O interface 308 may be configured to provide the data associated with map-matching a probe to a point-of-interest during a trip by a vehicle in a region. In accordance with an aspect, a user requesting information in a geographic region may be updated about historical (or static) road features, real-time or historical weather conditions, road conditions, road construction, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 302 may train the one or more machine learning models 310 to assist map-matching a probe to a point-of-interest during a trip by a vehicle in a region. In an aspect of the disclosure, the processor 302 may predict a probability of a POI matching a trip based on vehicle probe data, based on the one or more trained machine learning models in conjunction with ground truth of the region, such as measured real-time probe data, POI information, road conditions, or a combination thereof. In an aspect, a weighted linear regression model may be used to map-match a probe to a point-of-interest during a trip by a vehicle in a region map-matching a probe to a point-of-interest during a trip by a vehicle in a region, based on the one or more trained machine learning models in conjunction with ground truth of the region, such as vehicle probe data, POI geometries and areas, speed limit sign information, road conditions, or a combination thereof. In another aspect, a look-up table may be used for map-matching a probe to a point-of-interest during a trip by a vehicle in a region, based on the one or more trained machine learning models in conjunction with ground truth of the region, such as vehicle probe data, POI geometries and areas, speed limit sign information, road conditions, or a combination thereof.

In another aspect, a machine learning model, such as the one or more trained machine learning models 310 discussed earlier, may be used to map-match a probe to a point-of-interest during a trip by a vehicle in a region. In accordance with an aspect, the trained machine learning models 310 may be trained offline to obtain a classifier model to map-match a probe to a point-of-interest during a trip by a vehicle in a region, based on one or more trained machine learning models in conjunction with ground truth of the region, such as vehicle probe data, POI geometries and areas, speed limit sign information, road conditions, or a combination thereof. For the training of the trained machine learning models 310, different feature selection techniques and classification techniques may be used. The system 202 may be configured to obtain the trained machine learning models 310 and the trained machine learning models 310 may leverage historical information and real-time data for map-matching a probe to a point-of-interest during a trip by a vehicle in a region, based on one or more trained machine learning models in conjunction with ground truth of the region, such as vehicle probe data, POI geometries and areas, speed limit sign information, road conditions, or a combination thereof. In one aspect, supervised machine learning techniques may be utilized where ground truth data is used to train the model for different scenarios and then in areas where there is not sufficient ground truth data, the trained machine learning models 310 can be used to predict features or results.

In an aspect, the trained machine learning model 310 may be complemented or substituted with a transfer learning model. The transfer learning model may be used when the contextual factors related to map-matching a probe to a point-of-interest during a trip by a vehicle in a region, such as vehicle probe data, POI geometries and areas, speed limit sign information, road conditions, or a combination thereof are unavailable, sparse, incomplete, corrupted or otherwise unreliable for predicting critical areas in a region. The transfer learning model may then use historical map-matching recommendations for map-matching a probe to a point-of-interest during a trip by a vehicle in a region in a new region.

In accordance with an aspect, various data sources may provide the static and dynamic information for map-matching a probe to a point-of-interest during a trip by a vehicle in a region such as aggregations of locations and conditions that contribute to map-matching a probe to a point-of-interest during a trip by a vehicle in a region as an input to the machine learning models 310. Examples of the machine learning models 210 may include, but not limited to, Decision Tree (DT), HMMs, Random Forest, and Ada Boost. In accordance with an aspect, the memory 304 may include processing instructions for training of the machine learning model 310 with data set that may be real-time (or near real time) data or historical data. In accordance with an aspect, the data may be obtained from one or more service providers.

FIG. 4 illustrates an example map or geographic database 407, which may include various types of geographic data 440. The database may be similar to or an example of the database 208B. The data 440 may include but is not limited to node data 442, road segment or link data 444, map object and point of interest (POI) data 446, POI polygon data records 448, or the like (e.g., other data records 450 such as traffic data, sidewalk data, road dimension data, building dimension data, vehicle dimension/turning radius data, etc.). Other data records may include computer code instructions and/or algorithms for executing a trained machine learning model that is capable of map-matching a probe to a point-of-interest during a trip by a vehicle in a region.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the POI polygon data records 448 in some aspects. This data may also be stored elsewhere and supplied to the system 202 via any functional means.

In one aspect, the following terminology applies to the representation of geographic features in the database 407. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 407 follows certain conventions. For example, links do not cross themselves and do not cross each other except at a node. Also, there are no duplicated shape points, nodes, or links. Two links that connect each other have a common node.

The geographic database 407 may also include cartographic data, routing data, and/or maneuvering data as well as indexes 452. According to some example aspects, the road segment data records may be links or segments representing roads, streets, or paths, as may be used in calculating a route or recorded route information for map-matching a probe to a point-of-interest during a trip by a vehicle in a region. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 407 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 407 can include data about the POIs and their respective locations in the POI records. The geographic database 407 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 407 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 407 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF)

format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 407 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The POI polygon data records 448 may include various points of data such as, but not limited to POI polygon shape, POI polygon area. POI type, POI location, updates or changes to POI features, availability, accessibility, construction around or near the POI or a combination thereof.

FIG. 5 illustrates a flowchart 500 for acts taken in an exemplary method for map-matching a probe to a point-of-interest during a trip by a vehicle in a region, in accordance with an aspect. More, fewer or different steps may be provided. FIG. 5 is explained in conjunction with FIG. 1 to FIG. 4. The control starts at act 502.

At act 502, the system 202 may identify one or more POIs in the region. The POIs may be obtained from a map database or other database of pertinent POI information.

At act 504, the system 202 may determine, for one or more probes in the region, a latitude location of the one or more probes, a longitude location of the one or more probes and a data collection time stamp for the one or more probes. The system 202 may use vehicle sensors such a a GPS device, a mobile wireless device, a wearable device, a vehicle telematics sensor, a cellular geolocation device or a combination thereof.

At act 506, the system 202 may determine, for each of the one or more probes in the region, a proximity between the one or more probes and the one or more POIs within a predetermined radius of the one or more probes. In an aspect, the predetermined radius may be 30 m. Other distances may be possible based on the application and amount of data that needs to be processed for larger or smaller radii.

At act 508, the system 202 may determine, for each of the one or more POIs, a POI geographic coverage area. In an aspect, the POI geographic coverage area may be based on POI polygon geometry or POI polygon area, such as various shapes that may comprise a database of POI polygon geometry depending on the type, nature and size of a POI in a map or polygon database.

At act 510, the system 202 may calculate an observed POI probability from the proximity and the POI geographic coverage area.

Act 512, the system 202 may use a machine learning model to sequentially process the observed POI probability from a predetermined number of probes of the trip and to predict a most likely POI at which the one or more probes is clustered. In an aspect, the machine learning model may be a Hidden Markov Model (HMM). In an aspect, the predetermined number of probes of the trip may include the first 10 probes of the trip or the last 10 probes of the trip.

In an aspect, using the HMM may include inputting state transition probabilities to the HMM based on probabilities that the vehicles traversed more than one POI during the trip.

FIG. 6 illustrates an example application of the disclosed map-matching system and method. An exemplary map 600 with geographic and cartographic elements are shown, such as roads 601 and POI locations 602, along with vehicle probe indications 603, 604.

In the exemplary map, a vehicle is shown on a trip traversing a region 600. Vehicle probe indications are shown, such as the $10^{th}$ preceding probe 603 and the last probe 604. The vehicle probe indications show that the vehicle spent a lot of time around a POI 602, and did not proceed beyond POI 602. Using the disclosed map-matcher system and method, the proximities of the vehicle probe indications to given POIs in region 600 and the POI polygon geometries and areas would be sequentially fed into an HMM as described in relation to FIG. 5, to find the most probably POI to match to the trip-POI 602.

Blocks of the flowchart 500 support combinations of means for performing the specified functions and combinations of operations for performing the specified functions for performing the specified functions. It will also be understood that one or more blocks of the flowchart 500, and combinations of blocks in the flowchart 500, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 302 and/or a device or circuit for executing instructions or executing an algorithm for processing information as described above.

Although the aforesaid description of FIGS. 1-5 is provided with reference to the sensor data, however, it may be understood that the disclosure would work in a similar manner for different types and sets of data as well. The system 202 may generate/train the machine learning models 210 to evaluate different sets of data at various geographic locations. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for map-matching a probe to a point-of-interest (POI) during a trip by a vehicle in a region, the method comprising: identifying one or more POIs in the region; determining, for one or more probes in the region, a latitude location of the one or more probes, a longitude location of the one or more probes and a data collection time stamp for the one or more probes; determining, for each of the one or more probes in the region, a proximity between the one or more probes and the one or more POIs within a predetermined radius of the one or more probes; determining, for each of the one or more POIs, a POI geographic coverage area; calculating an observed POI probability from the proximity and the POI geographic coverage area; and using a machine learning model to sequentially process the observed POI probability from a predetermined number of probes of the trip and to predict a POI at which the one or more probes is clustered.

2. The method of claim 1, where using the machine learning model comprises using a Hidden Markov Model (HMM).

3. The method of claim 1, where the predetermined number of probes of the trip comprises the first 10 probes of the trip or the last 10 probes of the trip.

4. The method of claim 1, where the predetermined radius is 30 meters.

5. The method of claim 1, where the POI geographic coverage area comprises a POI polygon area.

6. The method of claim 2, where using the HMM further comprises inputting state transition probabilities to the HMM based on probabilities that the vehicles traversed more than one POI during the trip.

7. The method of claim 1, where the one or more probes comprise at least one of a GPS device, a mobile wireless device, a wearable device, a vehicle telematics sensor, a cellular geolocation device or a combination thereof.

8. A system for map-matching a probe to a POI during a trip by a vehicle in a region, comprising: at least one memory configured to store computer executable instructions; and at least one processor configured to execute the computer executable instructions to: identify one or more POIs in the region; determine, for one or more probes in the region, a latitude location of the one or more probes, a longitude location of the one or more probes and a data collection time stamp for the one or more probes; determine, for each of the one or more probes in the region, a proximity between the one or more probes and the one or more POIs within a predetermined radius of the one or more probes; determine, for each of the one or more POIs, a POI geographic coverage area; calculate an observed POI probability from the proximity and the POI geographic coverage area; and use a machine learning model to sequentially process the observed POI probability from a predetermined number of probes of the trip and to predict a POI at which the one or more probes is clustered.

9. The system of claim 8, where the computer executable instructions to use the machine learning model comprise computer executable instructions to use a Hidden Markov Model (HMM).

10. The system of claim 8, where the predetermined number of probes of the trip comprises the first 10 probes of the trip or the last 10 probes of the trip.

11. The system of claim 8, where the predetermined radius is 30 meters.

12. The system of claim 8, where the POI geographic coverage area comprises a POI polygon area.

13. The system of claim 9, where the computer executable instructions to use the HMM further comprise computer executable instructions to input state transition probabilities to the HMM based on probabilities that the vehicles traversed more than one POI during the trip.

14. The system of claim 8, where the one or more probes comprise at least one of a GPS device, a mobile wireless device, a wearable device, a vehicle telematics sensor, a cellular geolocation device or a combination thereof.

15. A computer program product comprising a non-transitory computer readable medium having stored thereon computer executable instructions, which when executed by one or more processors, cause the one or more processors to carry out operations for map-matching a probe to a POI during a trip by a vehicle in a region, the operations comprising: identifying one or more POIs in the region; determining, for one or more probes in the region, a latitude location of the one or more probes, a longitude location of the one or more probes and a data collection time stamp for the one or more probes; determining, for each of the one or more probes in the region, a proximity between the one or more probes and the one or more POIs within a predetermined radius of the one or more probes; determining, for each of the one or more POIs, a POI geographic coverage area; calculating an observed POI probability from the proximity and the POI geographic coverage area; and using a machine learning model to sequentially process the observed POI probability from a predetermined number of probes of the trip and to predict a POI at which the one or more probes is clustered.

16. The computer program product of claim 15, where the operations for using the machine learning model comprise operations for using a Hidden Markov Model (HMM).

17. The computer program product of claim 15, where the predetermined number of probes of the trip comprises the first 10 probes of the trip or the last 10 probes of the trip.

18. The computer program product of claim 15, where the predetermined radius is 30 meters.

19. The computer program product of claim 15, where the POI geographic coverage area comprises a POI polygon area.

20. The computer program product of claim 16, where using the HMM further comprises inputting state transition probabilities to the HMM based on probabilities that the vehicles traversed more than one POI during the trip.

* * * * *